United States Patent
Matsuda et al.

(10) Patent No.: US 7,071,925 B2
(45) Date of Patent: Jul. 4, 2006

(54) TOUCH PANEL AND AN INPUT DEVICE EQUIPPED THEREWITH

(75) Inventors: Genichi Matsuda, Shinagawa (JP); Shozo Furukawa, Shinagawa (JP)

(73) Assignee: Nagano Fujitsu Component Limited, Nagano (JP)

( * ) Notice: Subject to any disclaimer, the term of this patent is extended or adjusted under 35 U.S.C. 154(b) by 290 days.

(21) Appl. No.: 10/157,889

(22) Filed: May 31, 2002

(65) Prior Publication Data

US 2003/0030626 A1 Feb. 13, 2003

(30) Foreign Application Priority Data

Aug. 8, 2001 (JP) ............................. 2001-241187

(51) Int. Cl.
*G09G 5/00* (2006.01)
*G06K 11/06* (2006.01)

(52) U.S. Cl. .................................... 345/173; 178/18.01

(58) Field of Classification Search ........ 345/173–178; 178/18.01, 18.03–18.11
See application file for complete search history.

(56) References Cited

U.S. PATENT DOCUMENTS

| | | | | |
|---|---|---|---|---|
| 5,351,143 A | * | 9/1994 | Sato et al. | 349/12 |
| 5,510,406 A | * | 4/1996 | Matsuo et al. | 524/237 |
| 6,559,902 B1 | * | 5/2003 | Kusuda et al. | 349/12 |
| 2001/0008433 A1 | * | 7/2001 | Fujii et al. | 349/12 |

FOREIGN PATENT DOCUMENTS

| | | | |
|---|---|---|---|
| JP | 409150112 | * | 6/1997 |
| JP | 2001-34418 | | 2/2001 |
| JP | 02001060144 | * | 3/2001 |

* cited by examiner

*Primary Examiner*—Sumati Lefkowitz
*Assistant Examiner*—Alecia D. Nelon
(74) *Attorney, Agent, or Firm*—Staas & Halsey LLP

(57) ABSTRACT

A touch panel that includes a polarizing plate, and used as an input device of a display unit of a personal computer, a word processor, an electronic notebook and the like is structured by one or more films that have a low heat contraction coefficient and a low water absorption coefficient, which remarkably suppress occurrence of concave deformations of the polarizing plate after exposure to a high temperature and soaking in water, avoiding short circuits.

13 Claims, 13 Drawing Sheets

FIG.3
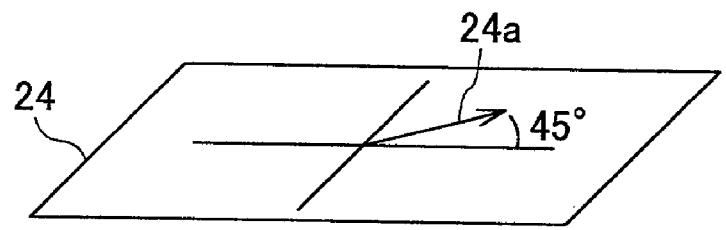
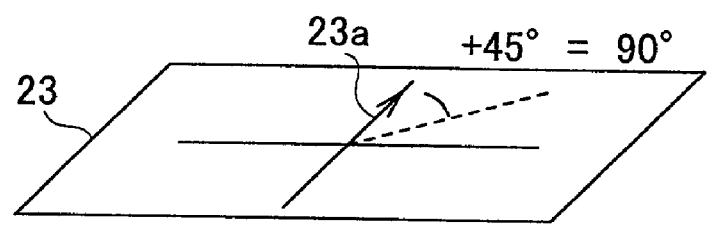
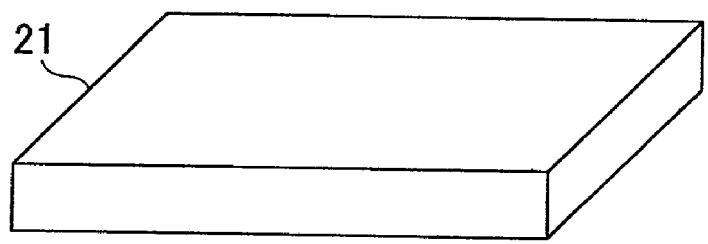
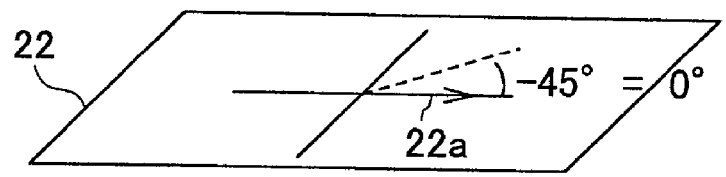
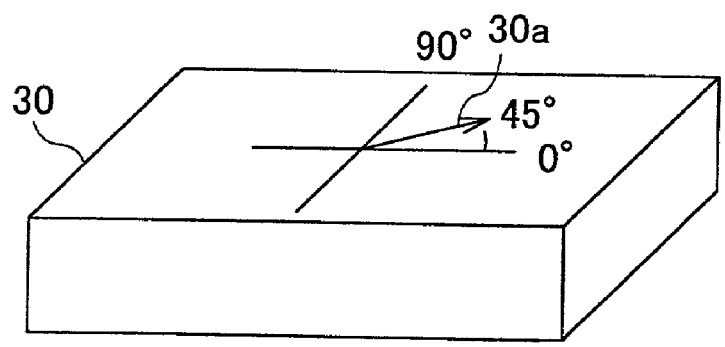

FIG.12

| DRWG | CONFIGURATION | | | | | EVALUATION RESULTS | | | | |
|---|---|---|---|---|---|---|---|---|---|---|
| | ANTIHEAT/ ANTIHUMIDITY FILM | POLARIZING PLATE | 1/4λ | UPPER PANEL FILM | 1/4λ | TOTAL REFLECTION RATIO % | HIGH TEMPERATURE | | HIGH HUMIDITY | |
| | | | | | | | CONCAVE | SHORT CIRCUIT | CONCAVE | SHORT CIRCUIT |
| 2 | PEN (WITH AR) | TAC* | PC* | PC | PC* | 1.1 | NO | NO | NO | NO |
| 7(A) | PEN (WITH AR) | TAC* | — | PC | — | 9.5 | NO | NO | NO | NO |
| 9 | F COATING | TAC* | PC* | PC | PC* | 1.5 | NO | NO | NO | NO |
| 5(A) | PEN (WITH AR) | TAC* | PC* | PNB | PC* | 1.3 | NO | NO | NO | NO |
| 5(B) | PEN (WITH AR) | TAC* | PC* | PCO | PC* | 1.2 | NO | NO | NO | NO |
| 5(C) | PEN (WITH AR) | TAC* | PC* | PES | PC* | 1.7 | NO | NO | NO | NO |
| 4(A) | PNB (WITH HC) | TAC* | PC* | PC | PC* | 3.2 | NO | NO | NO | NO |
| 4(B) | PCO (WITH HC) | TAC* | PC* | PC | PC* | 3.5 | NO | NO | NO | NO |
| 4(C) | PES (WITH HC) | TAC* | PC* | PC | PC* | 4.3 | NO | NO | NO | NO |
| 4(D) | PC (WITH HC) | TAC* | PC* | PC | PC* | 4.1 | NO | NO | NO | NO |
| 4(E) | PAR (WITH HC) | TAC* | PC* | PC | PC* | 3.9 | NO | NO | NO | NO |
| 7(B) | PNB (AR/HC) | TAC* | — | PC | — | 6.5 | NO | NO | NO | NO |
| 7(C) | PCO (AR/HC) | TAC* | — | PC | — | 6.3 | NO | NO | NO | NO |
| 7(D) | PES (AR/HC) | TAC* | — | PC | — | 7.3 | NO | NO | NO | NO |
| 7(E) | PC (AR/HC) | TAC* | — | PC | — | 6.8 | NO | NO | NO | NO |
| 7(F) | PAR (AR/HC) | TAC* | — | PC | — | 7.1 | NO | NO | NO | NO |

- ASTERISK (*) DENOTES THAT CITED MATERIALS ARE SAME AS CONVENTIONAL CONFIGURATION.
- THREE HYPHENS (—) DENOTE "NONE".
- IN EVALUATION RESULTS, "NO" MEANS NO OCCURRENCE OF CONCAVE AND SHORT CIRCUIT, "SOME" MEANS SOME CONCAVE OBSERVED, AND "YES" MEANS CONCAVE OR SHORT CIRCUIT OCCURRED.
- PNB MEANS POLYNORBORNEN
- PCO MEANS POLYCYCLOOLEFIN
- AR MEANS ANTIREFLECTION FILM

FIG.13

| DRWG | CONFIGURATION | | | | | EVALUATION RESULTS | | | | |
|---|---|---|---|---|---|---|---|---|---|---|
| | ANTIHEAT/ ANTIHUMIDITY FILM | POLARIZING PLATE | 1/4 λ | UPPER PANEL FILM | 1/4 λ | TOTAL REFLECTION RATIO % | HIGH TEMPERATURE | | HIGH HUMIDITY | |
| | | | | | | | CONCAVE | SHORT CIRCUIT | CONCAVE | SHORT CIRCUIT |
| 8 | --- | PCO (AR/HC) | PC* | PC | PC* | 2.8 | NO | NO | NO | NO |
| 11 | PEN (WITH AR) | TAC* | --- | 1/4 λ FILM | PC* | 1.3 | NO | NO | NO | NO |
| 6 | PEN (WITH AR) | TAC* | PC* | PC | PC* (NOTE 1) | | | | | |
| CON* | --- | TAC* (WITH AR) | PC* | PC | PC* | 1.5 | YES | YES | YES | YES |
| 1(A) | PET (WITH AR) | TAC* | PC* | PC | PC* | 1.5 | SOME | NO | SOME | YES |

NOTES IN ADDITION TO THOSE IN FIG.12
NOTE 1: AR FILM UNDER 1/4 λ FILM AND ANOTHER AR FILM ON LCD.
"CON*" DESIGNATES CONVENTIONAL TOUCH PANEL.

FIG.14

| | FILM TYPE | | HEAT CONTRACTION RATE % | | WATER ABSORPTION RATE % | MOISTURE ABSORPTION CONTRACTION RATE % |
|---|---|---|---|---|---|---|
| | | | 80 DEG C, 30 MINUTES | 100 DEG C, 30 MINUTES | 24HR, 23 DEG C WATER | 60 DEG C, 95% RH, 100 HR |
| 1 | POLYCARBONATE | PC | | 0.04 | 0.4 | |
| 2 | POLYNORBORNEN | PNB | | ≦0.1 | 0.4 | |
| 3 | POLYETHERSULPHONE | PES | | | 0.3 TO 0.4 | |
| 4 | POLYCYCLOOLEFIN | PCO | | 0 | <0.01 | |
| 5 | POLYARYLATE | PAR | | ≦0.1 | 0.15 TO 0.26 | |
| 6 | POLYETHYLENENAPHTHALATE | PEN | | 0.5 | 0.4 | |
| 7 | POLYETHYLENETEREPHTHALATE | PET | 0.2 | 0.8 | <0.8 | |
| 8 | TRIACETYL CELLULOSE | TAC | 0.4 | 0.9 | 2 TO 4.5 | |
| 9 | POLARIZING PLATE (NOTE 1) | | 0.4 | | 2 TO 4.5 | 1.5 |

NOTE 1: POLARIZING PLATE IS SUMITOMO CHEMICAL'S DYE MIXED POLARIZING PLATE SQ-1852AP, THICKNESS BEING 180 μm

TOUCH PANEL AND AN INPUT DEVICE EQUIPPED THEREWITH

BACKGROUND OF THE INVENTION

1. Field of the Invention

The present invention generally relates to a touch panel and an input device therewith, and specifically relates to a touch panel that employs a resistance film, and that is provided on a screen of a personal computer, a word processor, an electronic notebook, etc. for inputting.

2. Description of the Related Art

When using a personal computer and the like equipped with a touch panel, a problem is that readability, therefore, operability is reduced by reflection of fluorescent light indoors, and the sun light outdoors. The problem has been coped with by providing a λ/4 phase-difference film and a polarizing plate on the surface of a touch panel, such that reflection of an external light is suppressed in order to enhance the readability. Here, the polarizing plate is generally structured by an extended film of dye mixed polyvinyl alcohol, which has polarization properties, and is sandwiched by films of triacetyl cellulose (TAC). The heat expansion coefficient of triacetyl cellulose (TAC) films 17b and 17c is $5.4 \times 10^{-5}$ cm/cm/degree C., which is comparatively large. The heat expansion coefficient of the polarizing plate, due to its structure, is approximately equal to the heat expansion coefficient of the triacetyl cellulose (TAC) films.

A touch panel is exposed to the external environment, and is influenced by ambient temperature and humidity. Under a high ambient temperature, the polarizing plate provided for improvement in visibility expands greatly, causing a curvature, that is, the central part of the touch panel swells outward. If the touch panel swells, the force required for the pushing operation increases, giving a different feeling of operation and reducing operability. Therefore, resistance to ambient conditions, such as heat and humidity, is also important for a touch panel.

FIG. 1(A) shows a conventional touch panel 10 indicated by Japanese Patent 2001-34418. The touch panel 10 is structured by a touch panel main part 15 that includes a glass substrate 11, a film 12 layered on the glass substrate 11 attached by double-sided adhesive tape 13, on which a λ/4 phase-difference film 16, and a polarizing plate 17, both for suppressing reflected lights are provided, and further a polyethylene terephthalate (PET) film 18 for resisting environmental conditions is provided. On the glass substrate 11, a transparent resistance film 11a and dot-like spacers 11b are formed. Under the film 12, a transparent resistance film 12a is formed.

The polarizing plate 17 is structured by a film (polarizing film) 17a that is made by extending a film of dye mixed polyvinyl alcohol (PVA) to provide a polarization property, sandwiched by films 17b and 17c that are made from triacetyl cellulose (TAC). Thickness of the films 17b and 17c is several times the thickness of the film 17a. Thus, the heat expansion coefficient of the polarizing plate 17 becomes approximately that of the films 17b and 17c made from TAC, that is, $5.4 \times 10^{-5}$ cm/cm/degree C.

The heat expansion coefficient of the film 18 made from PET is $1.5 \times 10^{-5}$ cm/cm/degree C., and is about ¼ of the heat expansion coefficient of the films 17b and 17c made from TAC. The thickness of the film 18 made from PET is about the same as the thickness of the polarizing plate 17.

The film 18 made from PET pasted on the surface of the polarizing plate 17 functions such that the above-mentioned swelling phenomenon is suppressed under a severe high temperature condition.

Inventors of the present invention closely examined the touch panel 10 that contains the film 18 made from PET pasted on the surface of the polarizing plate 17, and through experiments, found the following matters relative to resistances to heat and humidity.

The touch panel was left under a high temperature and high humidity condition, then put back to the usual temperature and humidity condition. Then, the touch panel 10 was deformed into a concave shape as shown in FIG. 1(B).

If the surface of the touch panel 10 is deformed into a concave shape, there is a possibility that the film 12 will contact the glass substrate 11, causing a short circuit of the touch panel 10. If the resistance films 11a and 12a touch each other, making a short circuit, the touch panel 10 will not function properly. Therefore, concave deformation of the surface of a touch panel 10 is a more serious problem than the above-mentioned swelling phenomenon.

Further, when the surface of the touch panel 10 was deformed into a concave shape, exfoliation 19 occurred at a part of the adhesion portion of the film 12 to the glass substrate 11.

The inventors of the present invention analyzed the concave deformation and determined a cause thereof as follows.

When the polarizing plate 17 was exposed to an environment of high temperature, and then returned to a normal temperature, the polarizing plate 17 had become a little shorter than the original length.

Here, the heat contraction rate is defined as $\{(L0-L1)/L0\} \times 100$, where L0 is the original length, and L1 is the length after the exposure to high temperature and returning back to a normal temperature.

The heat contraction rate of the polarizing plate 17 was 0.9%, after a 30-minute exposure to a 100 degrees C. ambient environment.

Further, when the polarizing plate 17 was put in a high humidity ambient environment, and returned to the usual environment afterwards, it was noticed that the polarizing plate 17 had become a little shorter than the original length.

Then, a moisture absorption contraction rate is defined as $\{(L0-L2)/L0\} \times 100$, where L0 is the original length, and L2 is the length after the exposure to the humidity.

The moisture absorption contraction rate of the polarizing plate 17 was 1.5% at an exposure to 60 degrees C. and 95% RH for 100 hours. The water absorption rate of the polarizing plate 17 was 2–4.5%, when it was soaked in 23-degree C. water for 24 hours.

As above, the polarizing plate 17 expands thermally when exposed to high temperature, and shrinks to shorter than the original length when it is returned to room temperature, resulting in a permanent deformation. The polarizing plate 17 thereby becomes shorter than the film of the touch panel immediately underneath. Further, when the polarizing plate 17 is exposed to high humidity, it expands due to moisture absorption. When it is returned to room temperature, the moisture is reduced and the polarizing plate 17 contracts to shorter than the original length, resulting in a permanent deformation. The polarizing plate 17 shrinks to shorter than the film of the touch panel immediately underneath. Analysis indicates that the central part of the touch panel deforming into a concave shape is a permanent deformation, with the polarizing plate 17 shrinking to a shorter length than the film of the touch panel.

From above, it is determined that the permanent deformation of the polarizing plate caused by heat and humidity is the real problem to solve.

SUMMARY OF THE INVENTION

It is a general object of the present invention to provide a touch panel and an input device that includes the touch panel that substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the touch panel and the input device equipped therewith particularly pointed out in the specification in such full, clear, concise, and exact terms as to enable a person having ordinary skill in the art to practice the invention.

To achieve these and other advantages and in accordance with its purpose, as embodied and broadly described herein, the invention provides a touch panel that employs a film that has a small heat contraction rate and a small water absorption rate, and is made from one of polyethylene naphthalate, polynorbornen, polycycloolefin, polycarbonate, polyether sulphon, and polyarylate. Therein, a polarizing plate is covered by the film, and the polarization plate is configured by two sheets of the film sandwiching a polarizing film. The touch panel may include a fluororesin film that covers the polarizing plate. The touch panel of the present invention may include a λ/4 phase-difference film pasted to an upper surface of a glass substrate. The present invention also includes an input device that includes the touch panel.

BRIEF DESCRIPTION OF THE DRAWINGS

FIG. 3 is a diagram showing relations of direction of the absorption axis of the polarizing plate, and a λ/4 phase-difference film that constitute the touch panel of FIG. 2;

FIG. 12 is a table showing a composition and an evaluation of the embodiments of the present invention;

FIG. 13 is a continuation of FIG. 12; and

FIG. 14 is a table showing properties of films.

DESCRIPTION OF THE PREFERRED EMBODIMENTS

In the following, embodiments of the present invention will be described with reference to the accompanying drawings.

Figure 1:
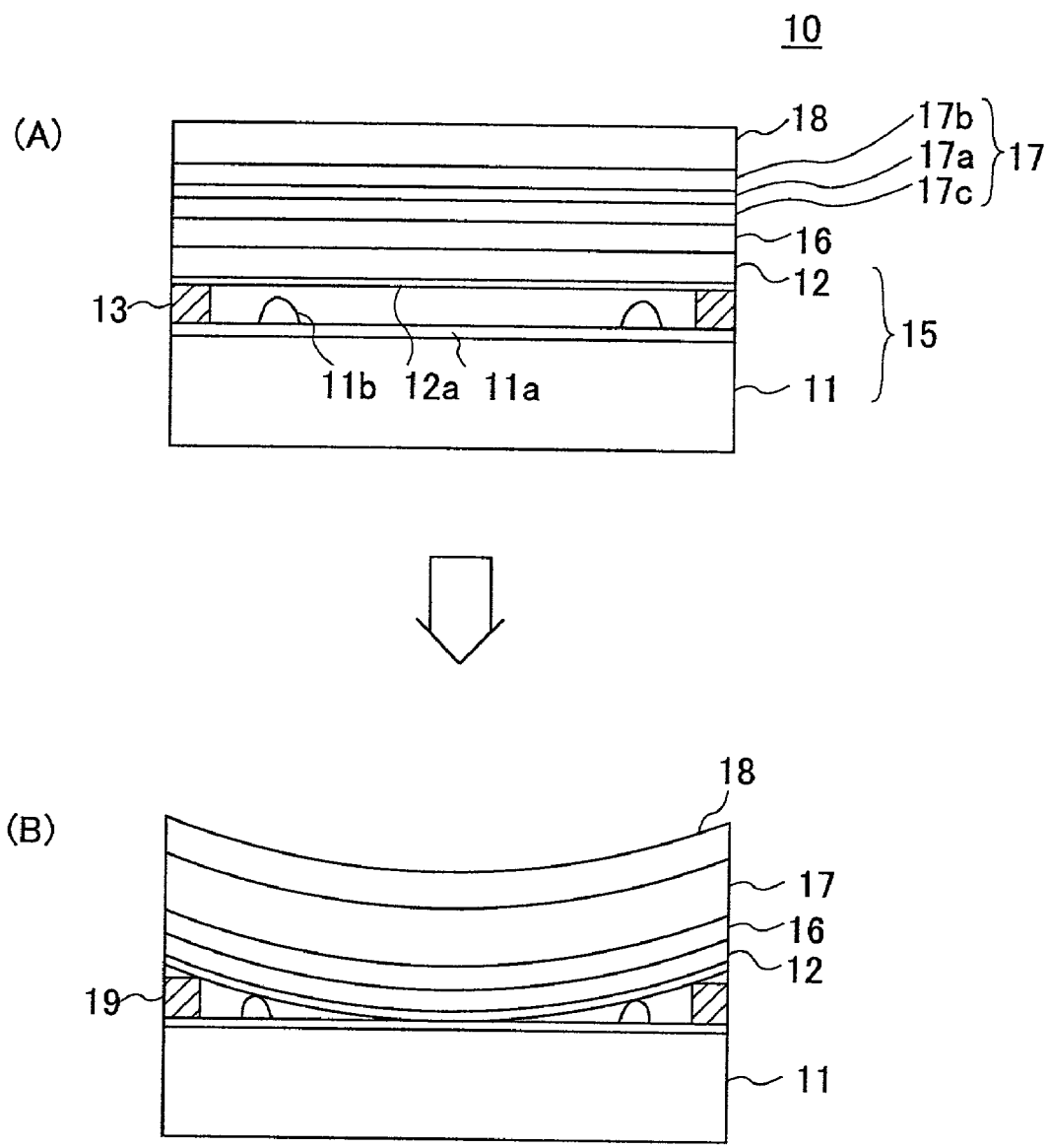
FIG. 1(A) is a diagram showing a conventional touch panel.
FIG. 1(B) is a diagram showing a conventional touch panel that experiences a concave deformation.
Figure 2:
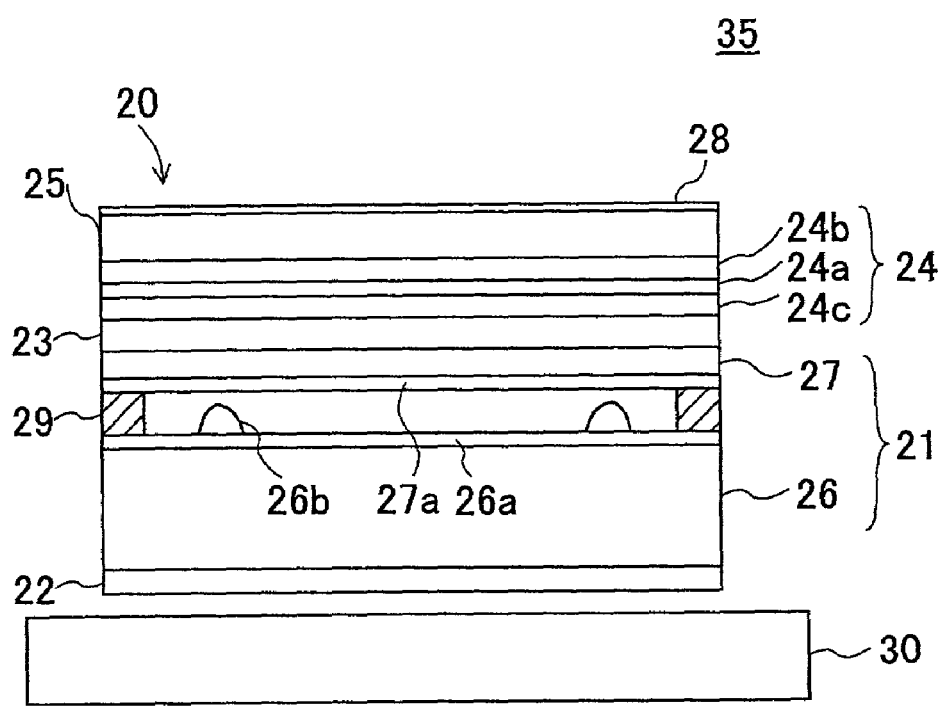
FIG. 2 is a diagram showing a touch panel of the first embodiment of the present invention.

FIG. 2 shows a touch panel 20 of the first embodiment of the present invention. The touch panel 20 is formed on the upper surface of a liquid crystal display 30. The liquid crystal display 30 and the touch panel 20 are components of an input device 35.

The touch panel 20 includes a λ/4 phase-difference film 22 pasted on the back of a touch panel main part 21 in order to suppress light reflection, another λ/4 phase-difference film 23 and a polarizing plate 24 pasted on the upper surface of the main part 21 of the touch panel in order to suppress light reflection, and a polyethylene naphthalate (PEN) film 25 pasted on the surface of the polarizing plate 24 in order to enhance resistance to high temperature and humidity.

Absorption axes of the λ/4 phase-difference film 22, the λ/4 phase-difference film 23, and the polarizing plate 24 have relations as shown in FIG. 3. An absorption axis 24a of the polarizing plate 24 and an absorption axis 30a of the liquid crystal display 30 are the same at 45 degrees. An absorption axis 23a of the λ/4 phase-difference film 23 is in a +45 degree direction to the absorption axis 24a of the polarizing plate 24. An absorption axis 22a of the λ/4 phase-difference film 22 is in a −45 direction to the absorption axis 24a of the polarizing plate 24.

The touch panel main part 21 includes a polycarbonate film 27 whose thickness is 100 micrometers and pasted by double-sided tape 29 on the upper surface of a glass substrate 26 whose thickness is 1.1 mm, and functions as a resistance film. A transparent resistance film 26a and dot-like spacers 26b are formed on the upper surface of the glass substrate 26. A transparent resistance film 27a is formed on the undersurface of the polycarbonate film 27.

The thickness of each of the λ/4 phase-difference film 22 and the λ/4 phase-difference film 23 is 50 micrometers.

The polarizing plate 24 includes an extended film 24a that is made by extending a hydrophilic resin film of polyvinyl alcohol that is mixed with dye, and giving a polarization property, sandwiched by films 24b and 24c made from triacetyl cellulose (TAC). Sumitomo Chemical's dye-mixed polarizing plate SQ-1852AP, with a thickness of 180 micrometers, is used as the polarizing plate 24.

As the polyethylene naphthalate (PEN) film 25, Kaladex 1030 made by Teijin DuPont is used. Thickness of the PEN film 25 that is pasted by an acrylic adhesion agent is 100 micrometers.

An antireflection film 28 is formed on the upper surface of the PEN film 25.

As shown in FIG. 14, the heat contraction rate of the PEN film 25 is 0.1% or less after it is exposed to 100 degrees C. for 30 minutes, and the water absorption rate is 0.4%, after it soaks in 23-degree C. water for 24 hours, which are considerably smaller than the heat contraction rate and the water absorption rate of the film 18 that is made from polyethylene terephthalate.

An evaluation result of the touch panel 20 that is configured as above is as follows (refer to FIG. 12).

The total light reflection factor was 1.1%. Specifically, neither a fluorescent ceiling light nor an operator's face was reflected by the surface of the touch panel 20; there was little reflection of sunlight outdoors; images presented by the liquid crystal display 30 were clear; and visibility was excellent.

A result of the high temperature storage examination of the touch panel 20 is as follows. The examination was made after exposing the touch panel 20 to a temperature of 100 degrees for 240 hours, and then returning it to room temperature. No concave deformations and no convex deformations were found; no short circuits were generated; and no exfoliations of the film 27 from the glass substrate 26 were found. These are owing to the film 25 suppressing contraction of the polarizing plate 24 that tends to contract when the touch panel 20 is exposed to high temperature for a long period of time, and then, put back to the usual environment, due to the property that the heat contraction rate of the film 25 is 0.1% or less.

A result of a high humidity storing examination of the touch panel 20 is as follows. The examination was made after storing the touch panel 20 at 60 degrees C. and 95% RH for 100 hours, and returning it to room temperature after that. No concave deformations and no convex deformations were found; no short circuits were generated; and no exfoliations of the film 27 from the glass substrate 26 were found. Due to the low water absorption rate of the film 25, the film 25 prevents contraction of the polarizing plate 24 by protecting the surface and by suppressing water absorption of the polarizing plate 24, when the touch panel 20 is stored at high humidity for a long period of time and put back to the usual environment afterward.

Next, a first group of variations of the first embodiment are explained.

FIGS. 4(A) through 4(E) show five variations belonging to the first group.

Figure 4:
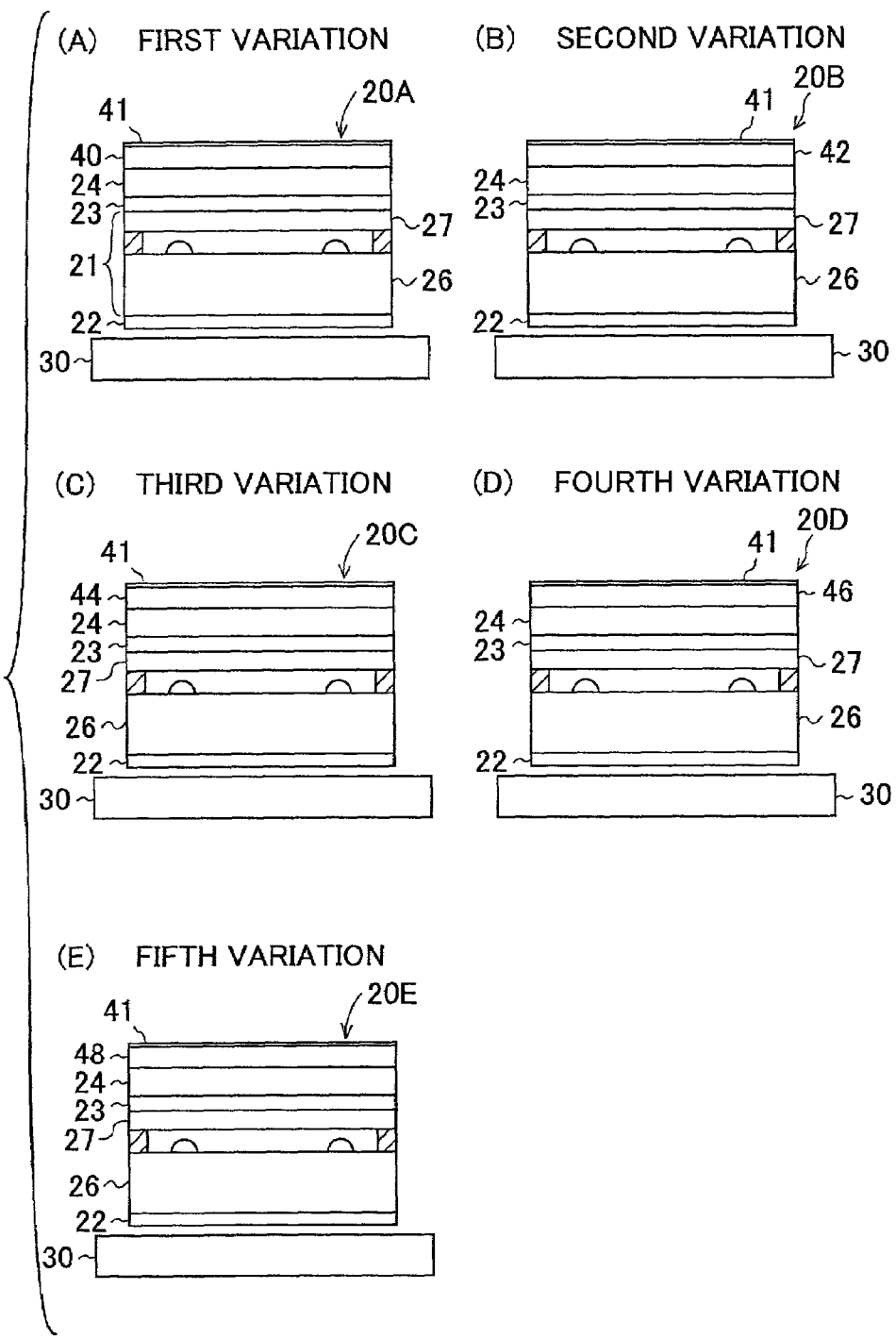
FIGS. 4(A), 4(B), 4(C), 4(D), and 4(E) are diagrams showing the first five variations of the first embodiment.

FIG. 4(A) shows a touch panel 20A of a first variation of the first group. On the polarizing plate 24, a polynorbornen film 40 (ARTON made by Japan Synthetic Rubber and thickness being 125 micrometers) is provided, which replaces the PEN film 25.

The heat contraction rate of the polynorbornen was 0.1% or less after exposing it to a temperature of 100 degrees C. for 30 minutes. When it soaked in 23-degree C. water for 24 hours, the water absorption rate was 0.4%. The rates are considerably smaller than the heat contraction rate and the water absorption rate (the moisture absorption contraction rate) of the polyethylene terephthalate film 18.

Further, on the upper surface of the polynorbornen film 40, a hard coat 41 of an acrylic resin is formed in place of the antireflection film 28.

An evaluation result of the touch panel 20A is as follows.

The total light reflection factor was 3.2%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 4(B) shows a touch panel 20B of the second variation. On the polarizing plate 24, the polyethylene naphthalate (PEN) film 25 is replaced with a polycycloolefin film 42 (Zeonor 1600R, made by Nippon Zeon, and thickness being 100 micrometers).

The heat contraction rate of the polycycloolefin was 0.0% after exposing it to a temperature at 100 degrees C. for 30 minutes, and when it soaked in 23-degree C. water for 24 hours, the water absorption rate was 0.01%. The rates are considerably smaller than those of the polyethylene terephthalate film 18.

Further, the hard coat 41 of an acrylic resin is formed on the upper surface of the polycycloolefin film 42.

An evaluation result of the touch panel 20B is as follows.

The total light reflection factor was 3.5%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 4(C) shows a touch panel 20C of the third variation. On the polarizing plate 24, the polyethylene naphthalate (PEN) film 25 is replaced with a polyethersulphone (PES) film 44 (VECTREX PES 5200G, made by ICI, and thickness being 175 micrometers).

When it soaked in 23-degree C. water for 24 hours, the water absorption rate of the polyethersulphone (PES) was 0.3–0.4%, and was considerably smaller than that of the film 18 made from polyethylene terephthalate.

Further, the hard coat 41 of an acrylic resin is formed on the upper surface of the film 44 made from polyethersulphone (PES).

An evaluation result of the touch panel 20C is as follows.

The total light reflection factor was 4.3%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 4(D) shows a touch panel 20D of the fourth variation. On the polarizing plate 24, the film 25 made from polyethylene naphthalate (PEN) is replaced with a film 46 made from polycarbonate (PC) (made by Teijin Chemicals and thickness being 100 micrometers).

The heat contraction rate of polycarbonate was 0.04% or less after exposure to a temperature of 100 degrees C. for 30 minutes, and when it soaked in 23-degree C. water for 24 hours, the water absorption rate was 0.4%. The rates are considerably smaller than those of the film 18 made from polyethylene terephthalate.

Further, the hard coat 41 of an acrylic resin is formed on the upper surface of the film 46 made from polycarbonate (PC).

An evaluation result of the touch panel 20D is as follows.

The total light reflection factor was 4.1%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 4(E) shows a touch panel 20E of the fifth variation. On the polarizing plate 24, the film 25 made from polyethylene naphthalate (PEN) is replaced with a film 48 (Emblate U-1, produced by Unitika) made from polyarylate (PAR).

When it soaked in 23-degree C. water for 24 hours, the water absorption rate of the polyarylate (PAR) was 0.15–0.26%, which is considerably smaller than that of the film 18 made from polyethylene terephthalate.

Further, the hard coat 41 of an acrylic resin is formed on the upper surface of the film 48 made from polyarylate (PAR).

An evaluation result of touch panel 20E is as follows.

The total light reflection factor was 3.9%. Further, the high temperature storing examination and the high humidity storing examination were performed under the same conditions as above. No concave deformations and no convex deformations were found; no short circuits were generated; and no exfoliations of the film 27 from the glass substrate 26 occurred.

Figure 5:
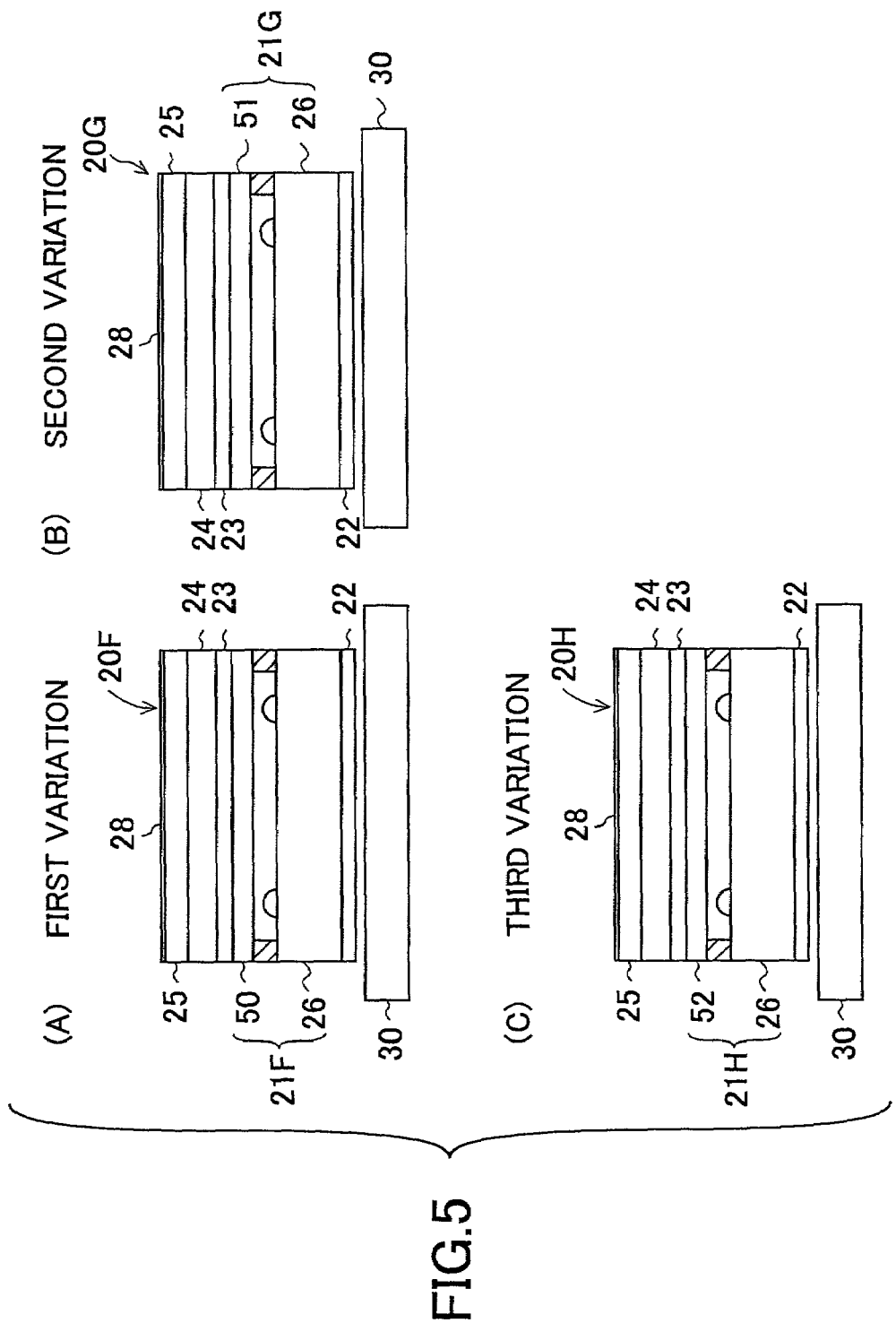
FIGS. 5(A), 5(B) and 5(C) are diagrams showing the second group of three variations of the first embodiment.

FIGS. 5(A) through 5(C) show a second group of variations.

The variations of the second group additionally include a PEN film 25 made from polyethylene naphthalate on the upper surface of the polarizing plate 24; and the material of the film 27 of the touch panel main part 21 is changed.

FIG. 5(A) shows a touch panel 20F of the first variation of the second group. On the polarizing plate 24, the film 25 made from polyethylene naphthalate (PEN) is formed, and the antireflection film 28 is formed on the upper surface of the film 25.

A touch panel main part 21F includes a film 50 of polynorbornen (ARTON, made by Japan Synthetic Rubber, and thickness being 175 micrometers) in place of the film 27 of polycarbonate, attached on the upper surface of the glass substrate 26 by a double-sided tape.

An evaluation result of the touch panel 20F is as follows.

The total light reflection factor was 1.3%. Further, the high temperature storing examination and the high humidity storing examination were performed under the same conditions as above. No concave deformations and no convex deformations were found; no short circuits were generated; and no exfoliations of the film 50 from the glass substrate 26 occurred.

FIG. 5(B) shows a touch panel 20G of the second variation of the second group. On the polarizing plate 24, the film 25 made from polyethylene naphthalate (PEN) is formed, and the antireflection film 28 is formed on the upper surface of the film 25.

A touch panel main part 21G includes a film 51 of polycycloolefin (Zeonor 1600R, made by Nippon Zeon, and thickness being 125 micrometers) attached on the upper surface of a glass substrate 26 in place of the film 27 of polycarbonate, by double-sided tape.

An evaluation result of the touch panel 20G is as follows.

The total light reflection factor was 1.2%. Further, the high temperature storing examination and the high humidity storing examination were performed under the same conditions as above. No concave deformations and no convex deformations were found; no short circuits were generated; and no exfoliations of the film 51 from the glass substrate 26 occurred.

FIG. 5(C) shows a touch panel 20H of the third variation of the second group. On the polarizing plate 24, the film 25 made from polyethylene naphthalate (PEN) is formed, and the antireflection film 28 is formed on the upper surface of the film 25.

A touch panel main part 21H includes a polyethersulphone (PES) film 52 (VECTREX PES 5200G, made by ICI, and thickness being 175 micrometers) in place of the polycarbonate film 27, pasted on the upper surface of a glass substrate 26 by double-sided tape.

An evaluation result of touch panel 20H is as follows.

The total light reflection factor was 1.7%. Further, the high temperature storing examination and the high humidity storing examination were performed under the same conditions as above. No concave deformations and no convex deformations were found; no short circuits were generated; and no exfoliations of the film 52 from the glass substrate 26 occurred.

Figure 6:
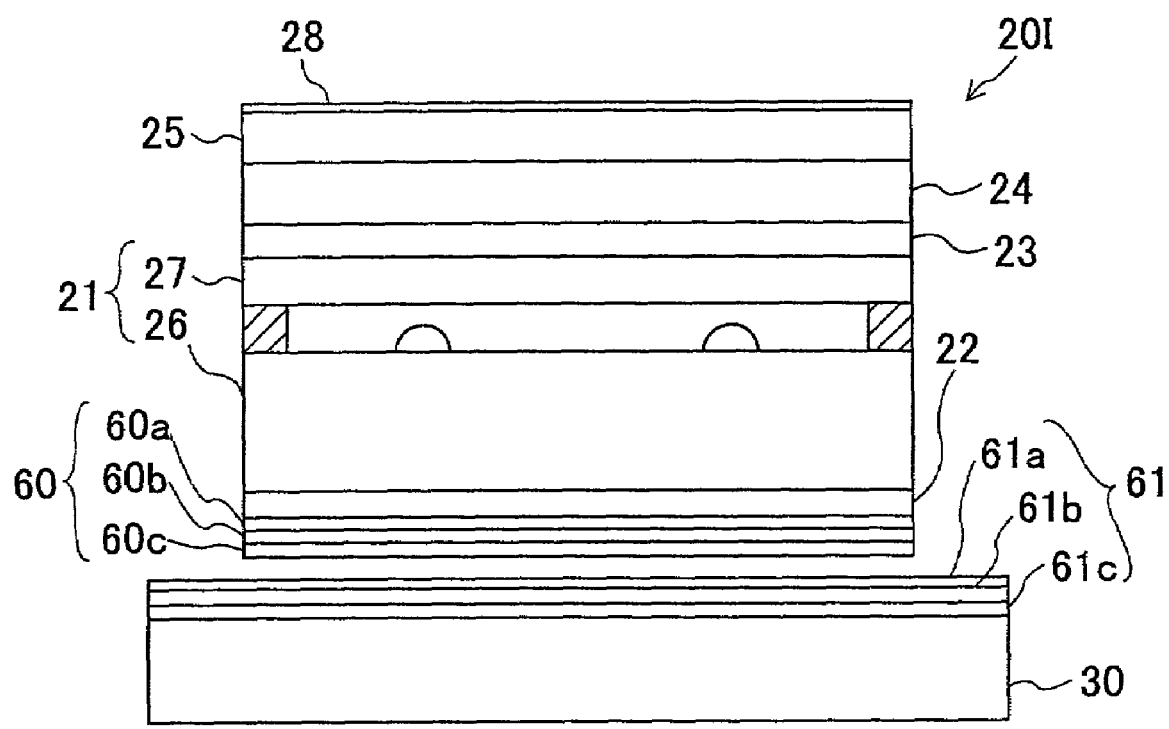
FIG. 6 is a diagram showing a third group containing one variation of the first embodiment.

FIG. 6 shows a variation belonging to a third group.

FIG. 6 shows a touch panel 20I. On the polarizing plate 24, the film 25 made from polyethylene naphthalate (PEN) is formed, and the antireflection film 28 is formed on the upper surface of this film 25.

An antireflection film 60 is formed under the lower surface of the λ/4 phase-difference film 22 that is pasted to the undersurface of the touch panel main part 21. The antireflection film 60 includes a silicon dioxide (SiO2) film 60a, an ITO film 60b, and another silicon dioxide film 60c.

An antireflection film 61 is formed on the upper surface of the liquid crystal display 30. The antireflection film 61 includes a silicon dioxide (SiO2) film 61a, an ITO film 61b, and another silicon dioxide film 61c.

An evaluation result of the touch panel 20I is as follows.

The total light reflection factor was 0.1%. Compared with the touch panel 20 of FIG. 2, images presented by the liquid crystal display 30 were clearer. Further, the high temperature storing examination and the high humidity storing examination were performed under the same conditions as above.

No concave deformations and no convex deformations were found; no short circuits were generated; and no exfoliations of the film 27 from the glass substrate 26 occurred.

FIGS. 7(A) through (F) show variations belonging to a fourth group.

The fourth group of the variations is characterized by not providing the λ/4 phase-difference films 23 and 22 that are shown in FIG. 2. Reduction of cost is the aim.

Figure 7:
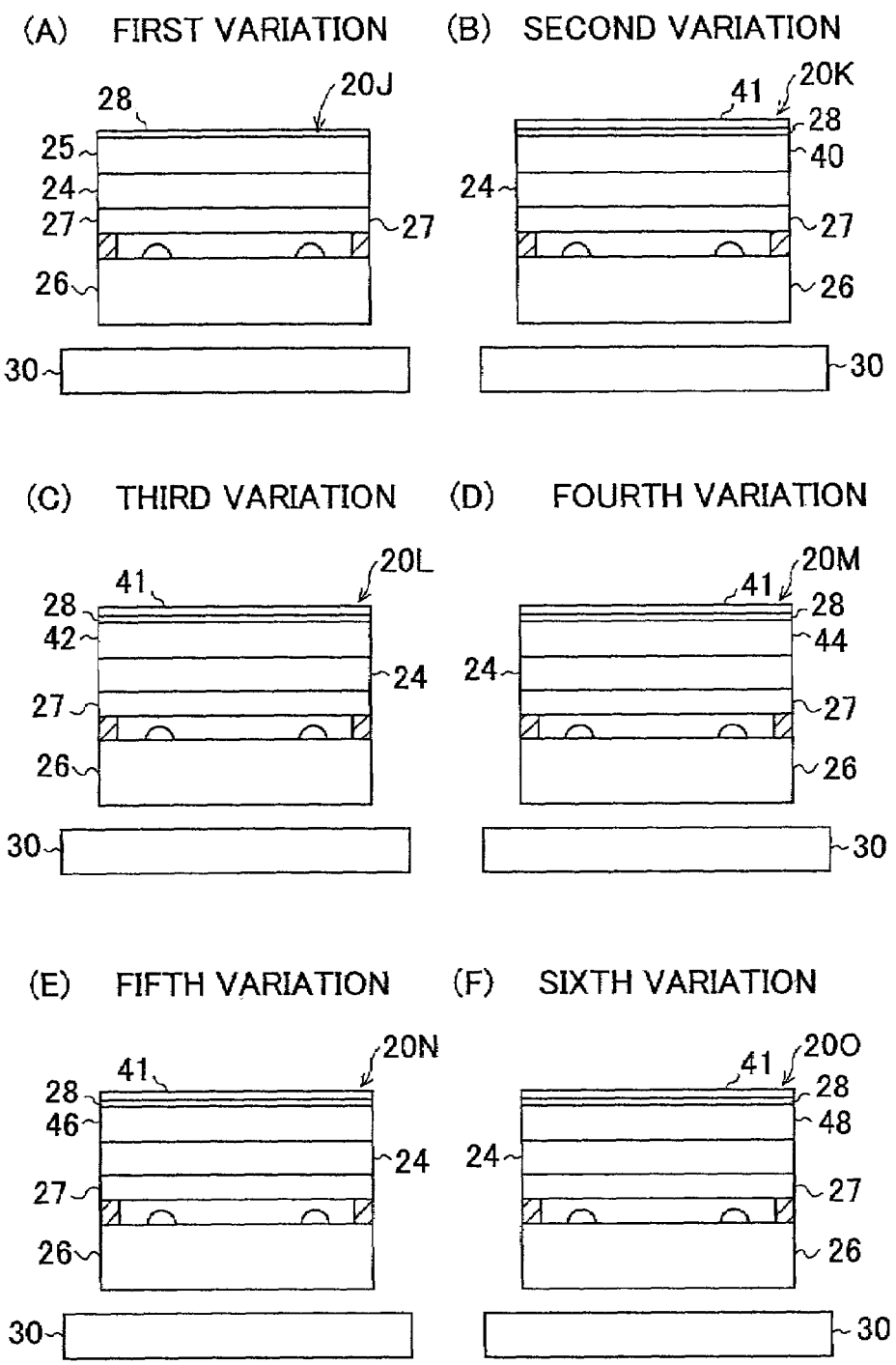
FIGS. 7(A), 7(B), 7(C), 7(D), 7(E) and 7(F) are diagrams showing the fourth group containing six variations of the first embodiment.

FIG. 7(A) shows a touch panel 20J of the first variation of the fourth group.

On the polarizing plate 24, the film 25 made from polyethylene naphthalate (PEN) is pasted, and the antireflection film 28 and a hard coat 41 of an acrylic resin are formed on the upper surface of the film 25.

The λ/4 phase-difference films 23 and 22 shown in FIG. 2 are not formed in this variation.

An evaluation result of the touch panel 20J is as follows.

The total light reflection factor was 9.5%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 7(B) shows a touch panel 20K of the second variation of the fourth group.

On the polarizing plate 24, a film 40 made from polynorbornen is pasted, and the antireflection film 28 and the hard coat 41 are formed on the upper surface of the film 40.

The λ/4 phase-difference films 23 and 22 shown in FIG. 2 are not formed.

An evaluation result of the touch panel 20K is as follows.

The total light reflection factor was 6.5%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 7(C) shows a touch panel 20L of the third variation of the fourth group.

On the polarizing plate 24, a film 42 made from the polycycloolefin is pasted, and the antireflection film 28 and the hard coat 41 are formed on the upper surface of the film 42.

The λ/4 phase-difference films 23 and 22 shown in FIG. 2 are not formed.

An evaluation result of the touch panel 20L is as follows.

The total light reflection factor was 6.3%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 7(D) shows a touch panel 20M of the fourth variation of the fourth group.

On the polarizing plate 24, a film 44 made from polyethersulphone (PES) is pasted, and the antireflection film 28 and the hard coat 41 are formed on the upper surface of the film 44.

The λ/4 phase-difference films 23 and 22 shown in FIG. 2 are not formed.

An evaluation result of the touch panel 20M is as follows.

The total light reflection factor was 7.3%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 7(E) shows a touch panel 20N of the fifth variation of the fourth group.

On the polarizing plate 24, a film 46 made from polycarbonate (PC) is pasted, and the antireflection film 28 and the hard coat 41 are formed on the upper surface of the film 46.

The λ/4 phase-difference films 23 and 22 of the upper and lower sides in FIG. 2 are not formed.

An evaluation result of the touch panel 20N is as follows.

The total light reflection factor was 6.8%. Further, the high temperature storing examination and the high humidity storing examination were performed under the same conditions as above. No concave deformations and no convex deformations were found; no short circuits were generated; and no exfoliations of the film 27 from the glass substrate 26 occurred.

FIG. 7(F) shows a touch panel 200 of the sixth variation of the fourth group.

On the polarizing plate 24, a film 48 made from the polyarylate (PAR) is pasted, and the antireflection film 28 and the hard coat 41 are formed on the upper surface of the film 48.

The λ/4 phase-difference films 23 and 22 shown in FIG. 2 are not formed.

An evaluation result of the touch panel 200 is as follows.

The total light reflection factor was 7.1%. Further, the high temperature storing examination and the high humidity storing examination were performed under the same conditions as above. No concave deformations and no convex deformations were found; no short circuits were generated; and no exfoliations of the film 27 from the glass substrate 26 occurred.

From above examinations and evaluations of the variations of the first embodiment, it is determined that the aimed objectives, that is, there should be no concave deformations and no short circuits, are achieved by employing a material having a heat contraction rate smaller than 0.3% after exposure to 100 degrees C. for 30 minutes, and a water absorption rate smaller than 0.5% after being soaked in 23-degree C. water for 24 hours, as the material for the film of the upper surface of the polarizing plate 24.

Figure 8:
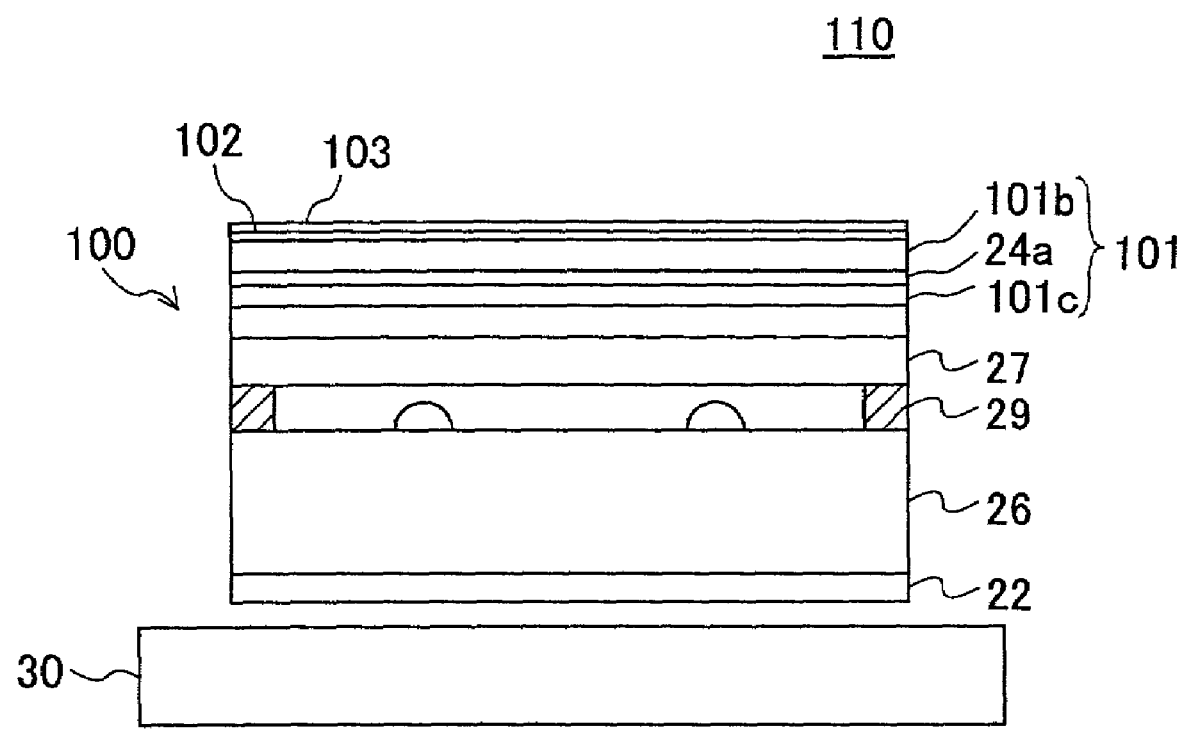
FIG. 8 is a diagram showing a touch panel of the second embodiment of the present invention.

A touch panel 100 of a second embodiment of the present invention is shown in FIG. 8. The touch panel 100 is formed on the upper surface of a liquid crystal display 30. The touch panel 100 and the liquid crystal display 30 are components of an input device 110.

The touch panel 100 is configured with a polarizing plate that has an enhanced resistance to heat and humidity. In FIG. 8, components that are the same as shown in FIG. 2 are referenced by the same reference numbers.

The touch panel 100 includes the touch panel main part 21, under the lower surface of which the λ/4 phase-difference film 22 is pasted in order to suppress the reflected light, and on the upper surface of the touch panel main part 21, the λ/4 phase-difference film 23 and a polarizing plate 101 are pasted in order to suppress the reflected light.

The polarizing plate 101 includes the extended film (polarizing film) 24a of polyvinyl alcoholic film with dye mixed and extended, and films 101b and 101c of polycycloolefin (Zeonor 1600R, made by Nippon Zeon, and thickness being 100 micrometers) in place of the films 24b and 24c of triacetyl cellulose (TAC). The film 24a is laminated with and sandwiched by the films 101b and 101c by a dry-laminating method.

The heat contraction rate of triacetyl cellulose (TAC) is 0.8% after an exposure to a temperature of 100 degrees C. for 30 minutes, and the water absorption rate is 2–4.5% after soaking in water of 23 degrees C. for 24 hours. On the other hand, the heat contraction rate of the polycycloolefin is 0.0% after an exposure to a temperature of 100 degrees C. for 30 minutes, and the water absorption rate is 0.01% after soaking in water of 23 degrees C. for 24 hours, both rates being considerably smaller than those of the triacetyl cellulose (TAC).

Further, the antireflection film 102 is formed on the upper surface of the polarizing plate 101, and the hard coat 103 of an acrylic resin is further formed on it.

An evaluation result of the touch panel 100 is as follows.

The total light reflection factor was 2.8%. Further, the high temperature storing examination and the high humidity storing examination were performed under the same conditions as above. No concave deformations and no convex deformations were found; no short circuits were generated; and no exfoliations of the film 27 from the glass substrate 26 occurred. This is due to the properties of the films 101b and 101c, that is, the heat contraction rate is 0.0%, and the water absorption rate (the moisture absorption contraction rate) is small. The properties enhance the resistance to heat and humidity of the polarizing plate 101.

Next, variations of the second embodiment of the present invention are explained.

Figure 9:
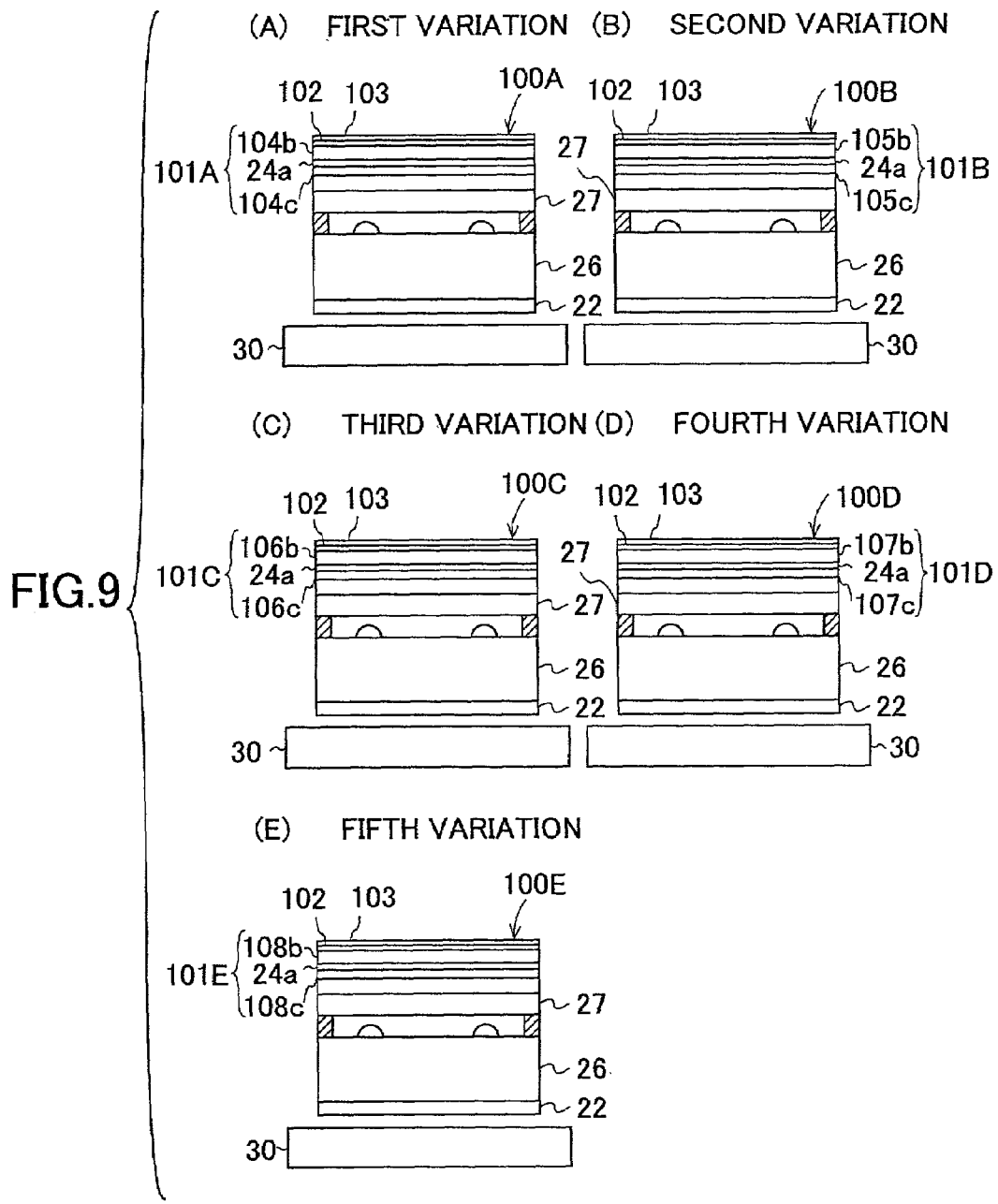
FIGS. 9(A), 9(B), 9(C), 9(D) and 9(E) are diagrams showing five variations of the second embodiment.

FIG. 9(A) shows a touch panel 100A of a first variation of the second embodiment.

A polarizing plate 101A includes films 104b and 104c made from polynorbornen in place of films 101b and 101c made from polycycloolefin. The films 104b and 104c sandwich the extended film 24a of polyvinyl alcohol with dye mixed by the dry-laminating method.

FIG. 9(B) shows a touch panel 100B of a second variation of the second embodiment.

A polarizing plate 101B includes films 105b and 105c made from polycycloolefin in place of the films 101b and 101c made from polycycloolefin. The films 105b and 105c sandwich the extended film 24a of polyvinyl alcohol with dye mixed by the dry-laminating method.

FIG. 9(C) shows a touch panel 100C of a third variation of the second embodiment.

A polarizing plate 101C includes films 106b and 106c made from polyethersulphone in place of the films 101b and 101c made from polycycloolefin. The films 106b and 106c sandwich the extended film 24a of polyvinyl alcohol with dye mixed by the dry-laminating method.

FIG. 9(D) shows a touch panel 100D of a fourth variation of the second embodiment.

A polarizing plate 101D includes films 107b and 107c made from polycarbonate in place of the films 101b and 101c made from polycycloolefin. The films 107b and 107c sandwich the extended film 24a of polyvinyl alcohol with dye mixed by the dry-laminating method.

FIG. 9(E) shows a touch panel 100E of a fifth variation of the second embodiment.

A polarizing plate 101E includes films 108b and 108c made from polyarylate in place of the films 101b and 101c made from polycycloolefin. The films 108b and 108c sandwich the extended film 24a of polyvinyl alcohol with dye mixed by the dry-laminating method.

An evaluation result of the touch panels 100A through 100E of the above variations is as follows. Under the same conditions as above, the high temperature storing examination and the high humidity storing examination were performed. No concave deformations and no convex deformations were found; no short circuits were generated; and no exfoliations of the film 27 from the glass substrate 26 occurred.

From the above examinations and evaluations of the second embodiments and variations thereof, it is determined that the objectives that no concave deformations occur and no short circuits are generated, are achieved by using a material having a heat contraction rate smaller than 0.3% after exposure to a temperature of 100 degrees C. for 30 minutes, and a water absorption rate smaller than 0.5% after being soaked in 23-degree C. water for 24 hours, as the material of the films that sandwich the extended film 24a of polyvinyl alcohol.

It is highly desirable that the material of the films that sandwich the extended film 24a of polyvinyl alcohol has the heat contraction rate smaller than 0.04% after exposure to a temperature of 100 degrees C. for 30 minutes, and the water absorption rate smaller than 0.4% when soaked in 23-degree C. water for 24 hours.

Figure 10:
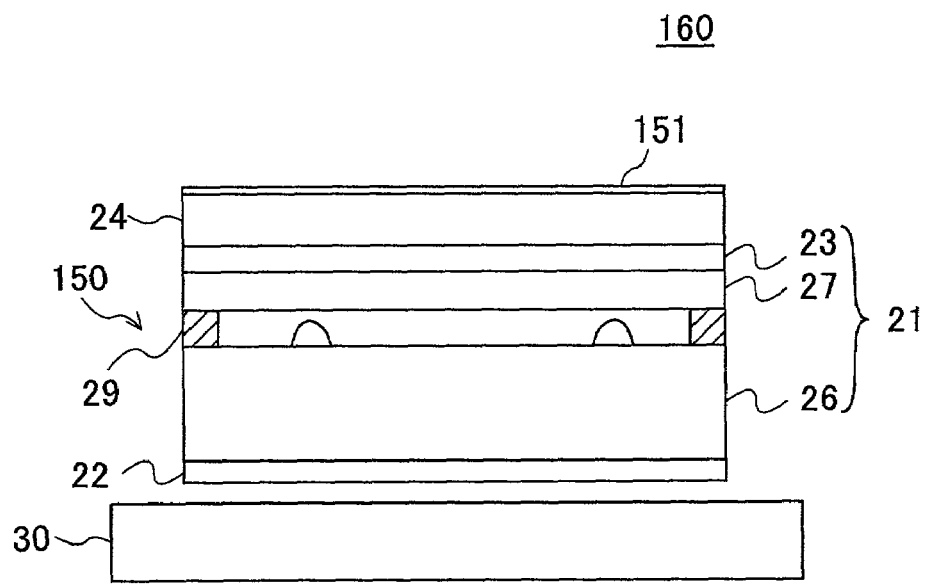
FIG. 10 is a diagram showing a touch panel of the third embodiment of the present invention.

A touch panel 150 of a third embodiment of the present invention is shown in FIG. 10. The touch panel 150 is formed on the upper surface of the liquid crystal display 30. The touch panel 150 and the liquid crystal display 30 are components of an input device 160.

The touch panel 150 includes a film of fluororesin 151 on the upper surface of the polarizing plate 24, which is provided aiming at improvement in resistance to heat and humidity. In FIG. 10, components that are the same as in FIG. 2 are referenced by the same reference numbers.

The third embodiment provides a fluororesin film 151 that has a thickness of about 50 micrometers. The fluororesin is formed by applying a fluorine surface treatment agent to the upper surface of the polarizing plate 24, a fluororesin coating, and then, dry-hardening.

An evaluation result of the touch panel 150 is as follows.

The total light reflection factor was 1.5%. Further, the high temperature storing examination and the high humidity storing examination were performed under the same conditions as above. No concave deformations and no convex deformations were found; no short circuits were generated; and no exfoliations of the film 27 from the glass substrate 26 occurred.

Figure 11:
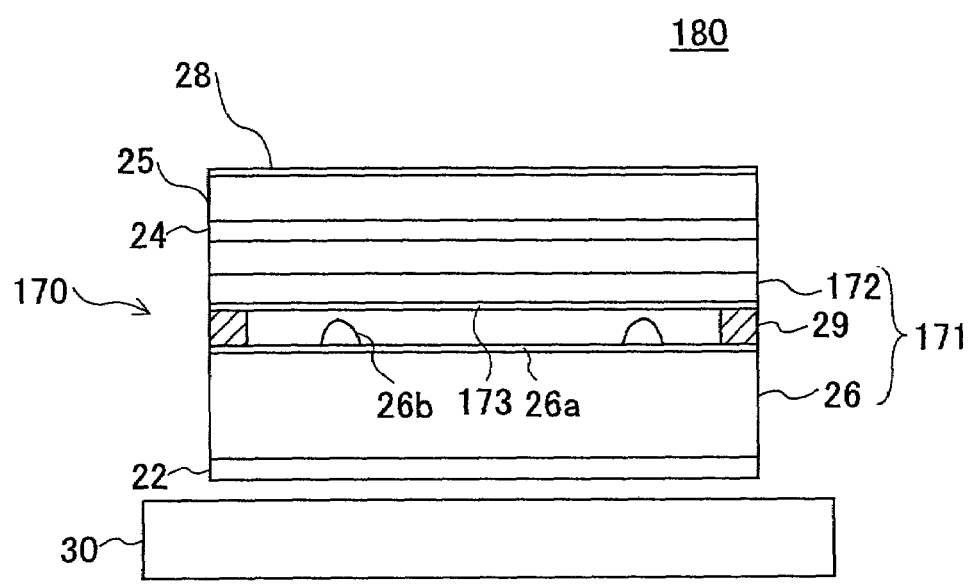
FIG. 11 is a diagram showing a touch panel of the fourth embodiment of the present invention.

A touch panel 170 of a fourth embodiment of the present invention is shown in FIG. 11. The touch panel 170 is formed on the upper surface of the liquid crystal display 30. The touch panel 170 and the liquid crystal display 30 are components of an input device 180.

The touch panel 170 includes a λ/4 phase-difference film 172 pasted on the upper surface of the touch panel main part 171, and a PEN film 25 in order to enhance resistances to heat and humidity on the upper surface.

A touch panel main part 171 of the touch panel 170 includes the glass substrate 26 on which a transparent resistance film 26a and a dot-like spacer 26b are formed, and a λ/4 phase-difference film 172 that has a transparent resistance film 173 formed under the surface thereof formed by sputtering. As the λ/4 phase-difference film 172, Sumitomo Chemical's Sumikalite SEF-400138 is employed, the thickness of which is 100 micrometers. The film 172 is pasted on the upper surface of the glass substrate 26 by the double-sided tape 29. This λ/4 phase-difference film 172 elastically bends and restores as pushed by a fingertip and the like, such that the transparent resistance film 173 touches and separates from, according to the fingertip operation, the transparent resistance film 26a. In this manner, a touch operation is detected, and a touch position is determined. That is, the λ/4 phase-difference film 172 plays the same role, in regard to touch operation, as the film 27 that constitutes the touch panel main part 21 shown in FIG. 2.

The polarizing plate 24 is pasted on the upper surface of the touch panel main part 171 by an acrylic adhesion agent.

Further, the film 25 made from polyethylene naphthalate (PEN) whose thickness is 100 micrometers is pasted on the upper surface of the polarizing plate 24 by an acrylic adhesion agent. The antireflection film 28 is formed on the upper surface of the film 25.

The λ/4 phase-difference film 22 is pasted under the lower surface of the glass substrate 26 of the touch panel main part 171.

An evaluation result of the touch panel 170 is as follows.

The total light reflection factor was 1.3%. Further, the high temperature storing examination and the high humidity storing examination were performed under the same conditions as above. No concave deformations and no convex deformations were found; no short circuits were generated; and no exfoliations of the λ/4 phase-difference film 172 from the glass substrate 26 occurred.

Further, since the touch panel 170 is configured such that the λ/4 phase-difference film arranged on the upper side serves as the film of the upper surface of the touch panel main part, the film 27 in FIG. 2 is dispensed with. That is, the touch panel 170 has one fewer component parts than the touch panel 20 shown in FIG. 2. Therefore, the touch panel 170 can be produced at a lower manufacturing cost than the touch panel 20 shown in FIG. 2.

In addition, in order to make the λ/4 phase-difference film function as the film of the upper surface of the touch panel main part, the transparent resistance film 173 is directly formed under the lower surface of the λ/4 phase-difference film 172.

In addition, the film 25 made from polyethylene naphthalate may be replaced with a film made from one of polynorbornen, polycycloolefin, polycarbonate, polyethersulphone, and polyarylate.

Further, it is also possible to consider a suitable combination of the first embodiment, the second embodiment, the third embodiment, and the fourth embodiment, and variations thereof. In this manner, the resistance to heat and humidity of a touch panel can be further enhanced.

Further, the touch panel of each of the embodiments and the variations thereof can be applied to an upper surface of other types of displays, such as plasma displays and CRT displays, besides liquid crystal displays.

The input devices 35, 110, 160 and 180 are configured, among other things, with any one of the touch panels as specifically described in their respective sections of the above description, such that the high readability and the high resistance to heat and humidity of the touch panels of the present invention may be enjoyed.

According to the present invention, as described above, no concave deformations occur by employing a film whose heat contraction rate and water absorption rate are small, as the film that is pasted on the upper surface of the polarizing plate, and as the films that sandwich the polarizing film of the polarizing plate, avoiding occurrence of short circuits, and resulting in a high resistance to ambient conditions, such as heat and humidity. In addition, by employing the polarizing plate, reflection of an external light is suppressed, resulting in a high readability.

Using a fluororesin film also achieves the objectives.

The present invention also provides a touch panel that is configured by one fewer component parts than conventional products.

The input device of the present invention employs the touch panel of the present invention, providing the enhanced resistance to heat and humidity.

Further, the present invention is not limited to these embodiments, but various modifications and variations may be made without departing from the scope of the present invention.

The present application is based on Japanese priority application No. 2001-241187 filed on Aug. 8, 2001 with the Japanese Patent Office, the entire contents of which are hereby incorporated by reference.

What is claimed is:

1. A touch panel, having a polarizing plate on an upper surface of a main part of the touch panel, comprising a film pasted on an upper surface of the polarizing plate, the film having a heat contraction rate smaller than 0.3% after being exposed to a temperature of 100 degrees C. for 30 minutes, and a water absorption rate smaller than 0.5% after having been soaked in 23-degree C. water for 24 hours.

2. The touch panel as claimed in claim 1, wherein the film is made from one of:
polyethylene naphthalate,
polynorbornen,
polycycloolefin,
polycarbonate,
polyethersulphone, and
polyarylate.

3. An input device, comprising a touch panel as claimed in claim 2, the touch panel being on a surface of a display unit.

4. The touch panel as claimed in claim 1, further comprising a liquid crystal panel underneath said main part such that said main part is mounted upon said liquid crystal panel, said film pasted on said upper surface of said polarizing plate being formed of a flouroresin film.

5. An input device, comprising a touch panel as claimed in claim 1, the touch panel being on a surface of a display unit.

6. The touch panel as claimed in claim 1, further comprising a liquid crystal panel underneath said main part such that said main part is mounted upon said liquid crystal panel, wherein said film pasted on said upper surface of said polarizing plate is a transparent film.

7. A touch panel as claimed in claim 6, wherein the transparent film is made of one of:
polyethylene napthalate,
polynorbornen,
polycycloolefin,
polycarbonate,
polyethersulphone, and
polyarylate.

8. A touch panel, having a polarizing plate on an upper surface of a main part of the touch panel, the polarizing plate comprising two films and a polarizing film, wherein the two films sandwich the polarizing film, each of the films that sandwich the polarizing film having a heat contraction rate smaller than 0.3% after being exposed to a temperature of 100 degrees C. for 30 minutes, and a water absorption rate smaller than 0.5% after having been soaked in 23-degree C. water for 24 hours.

9. The touch panel as claimed in claim 8, wherein each of the films that sandwich the polarizing film is made from one of:
polyethylene naphthalate,
polynorbornen,
polycycloolefin,
polycarbonate,
polyethersulphone, and
polyarylate.

10. An input device, comprising a touch panel as claimed in claim 9, the touch panel being on a surface of a display unit.

11. An input device, comprising a touch panel as claimed in claim 8, the touch panel being on a surface of a display unit.

12. A touch panel, comprising:
a glass substrate;
a first transparent resistance film formed on an upper surface of the glass substrate;
a further resistance film having an upper surface and a lower surface;
a second transparent resistance film, formed on the lower surface of the further resistance film and pasted along peripheral portions thereof to, while spaced from, the upper surface of the glass substrate having the first transparent resistance film thereon;
a polarizing plate pasted on the upper surface of the further resistance film;
a transparent film pasted on an upper surface of the polarizing plate, having a heat contraction rate smaller than 0.3% after being exposed to a temperature of 100 degrees C. for 30 minutes, and a water absorption rate smaller than 0.5% after having been soaked in 23-degree C. water for 24 hours, and made from one of:
polyethylene napthalate,
polynorbomen,
polycycloolefin,
polycarbonate,
polyethersulphone, and
polyarylate; and
the touch panel being formed on a liquid crystal display panel.

13. A touch panel as claimed in claim 12, further comprising:
a first λ/4 phase-difference film formed on a bottom surface of the glass substrate and having an absorption axis at a −45° direction relatively to the absorption axis of the polarizing plate; and
a second λ/4 phase-difference film having an absorption axis at a +45° direction relatively to the absorption axis of the polarizing plate, farmed between the upper surface of the further resistance film and a lower surface of the polarizing plate.

* * * * *

UNITED STATES PATENT AND TRADEMARK OFFICE
CERTIFICATE OF CORRECTION

| | | |
|---|---|---|
| PATENT NO. | : 7,071,925 B2 | Page 1 of 1 |
| APPLICATION NO. | : 10/157889 | |
| DATED | : July 4, 2006 | |
| INVENTOR(S) | : Genichi Matsuda et al. | |

It is certified that error appears in the above-identified patent and that said Letters Patent is hereby corrected as shown below:

On Title page
Item (56) References Cited, U.S. Patent Documents, column 2, line 13, change "Nelon" to --Nelson--

Column 16, line 24, change "polynorbomen" to --polynorbornen--

Column 16, line 39, change "farmed" to --formed--

Signed and Sealed this

Twenty-sixth Day of December, 2006

JON W. DUDAS
*Director of the United States Patent and Trademark Office*